US008889029B2

(12) United States Patent
Takenoshita

(10) Patent No.: US 8,889,029 B2
(45) Date of Patent: Nov. 18, 2014

(54) FERRITE SINTERED BODY AND NOISE FILTER INCLUDING THE SAME

(75) Inventor: Hidehiro Takenoshita, Kirishima (JP)

(73) Assignee: Kyocera Corporation, Kyoto (JP)

( * ) Notice: Subject to any disclaimer, the term of this patent is extended or adjusted under 35 U.S.C. 154(b) by 111 days.

(21) Appl. No.: 13/813,908

(22) PCT Filed: Aug. 3, 2011

(86) PCT No.: PCT/JP2011/067788
§ 371 (c)(1),
(2), (4) Date: Feb. 1, 2013

(87) PCT Pub. No.: WO2012/018052
PCT Pub. Date: Feb. 9, 2012

(65) Prior Publication Data
US 2013/0126264 A1    May 23, 2013

(30) Foreign Application Priority Data

Aug. 3, 2010   (JP) .................................. 2010-174538
Feb. 25, 2011  (JP) .................................. 2011-040087

(51) Int. Cl.
| | |
|---|---|
| C04B 35/30 | (2006.01) |
| H01F 1/34 | (2006.01) |
| H01F 17/04 | (2006.01) |
| C09K 3/00 | (2006.01) |
| C04B 35/26 | (2006.01) |
| H01F 27/33 | (2006.01) |
| H01F 41/02 | (2006.01) |
| G10K 15/00 | (2006.01) |
| C04B 35/626 | (2006.01) |
| C04B 35/638 | (2006.01) |
| H01F 17/06 | (2006.01) |

(52) U.S. Cl.
CPC ............... *C09K 3/00* (2013.01); *C04B 35/2666* (2013.01); *C04B 35/2658* (2013.01); *H01F 17/04* (2013.01); *H01F 27/33* (2013.01); *C04B 2235/763* (2013.01); *C04B 2235/785* (2013.01); *C04B 2235/786* (2013.01); *H01F 1/344* (2013.01); *H01F 17/06* (2013.01); *H01F 41/0246* (2013.01); *G10K 15/00* (2013.01); *C04B 35/265* (2013.01); *C04B 35/62655* (2013.01); *C04B 35/62675* (2013.01); *C04B 35/638* (2013.01); *C04B 2235/3208* (2013.01); *C04B 2235/3232* (2013.01); *C04B 2235/3272* (2013.01); *C04B 2235/3279* (2013.01); *C04B 2235/3281* (2013.01); *C04B 2235/3284* (2013.01); *C04B 2235/34* (2013.01); *C04B 2235/3418* (2013.01); *C04B 2235/5436* (2013.01); *C04B 2235/5445* (2013.01); *C04B 2235/6562* (2013.01); *C04B 2235/6565* (2013.01); *C04B 2235/662* (2013.01); *C04B 2235/72* (2013.01); *C04B 2235/726* (2013.01); *C04B 2235/85* (2013.01); *C04B 2235/95* (2013.01); *C04B 2235/96* (2013.01); *H01F 17/045* (2013.01)
USPC .......... 252/62.6; 252/62.62; 333/185; 336/233

(58) Field of Classification Search
CPC ............ C04B 35/2666; C04B 35/2658; C04B 2235/3281; H01F 1/344; H01F 17/04; H01F 27/33
USPC ................. 252/62.6, 62.62; 333/185; 336/233
See application file for complete search history.

(56) References Cited

U.S. PATENT DOCUMENTS

| | | |
|---|---|---|
| 2005/0023501 A1 | 2/2005 | Ishida et al. |
| 2005/0199852 A1 | 9/2005 | Takenoshita |
| 2005/0258393 A1 | 11/2005 | Takane et al. |

FOREIGN PATENT DOCUMENTS

| | | | |
|---|---|---|---|
| CN | 1673176 | A | 9/2005 |
| CN | 1700370 | A | 11/2005 |
| JP | 08-310856 | * | 11/1996 |
| JP | H08-310856 | A | 11/1996 |
| JP | 2002-104871 | A | 4/2002 |
| JP | 2003-137645 | A | 5/2003 |
| JP | 2003-212661 | A | 7/2003 |
| JP | 2004-269316 | A | 9/2004 |
| JP | 2004-300016 | * | 10/2004 |
| JP | 2004-323283 | A | 11/2004 |
| JP | 2005-64468 | A | 3/2005 |
| JP | 2006-151742 | A | 6/2006 |
| JP | 4587542 | B2 | 9/2010 |

OTHER PUBLICATIONS

Translation for JP 08-310856, Nov. 26, 1996.*
Wu Jianfeng et al. Preparation and Study of High-efficiency Infrared Radiation Ceramics with Spinel Type Structure. vol. 12 No. 6 Serial No. 63. Year 2002 in China.
Office Action dated Oct. 28, 2013, issued in counterpart Chinese Application No. 201180037296.9.

(Continued)

*Primary Examiner* — Carol M Koslow
(74) *Attorney, Agent, or Firm* — Procopio, Cory, Hargreaves & Savitch, LLP.

(57) ABSTRACT

A ferrite sintered body having an improved strength and a noise filter including the same are provided. A ferrite sintered body includes 1 mol % to 10 mol % Cu on CuO basis, a spinel-structured crystal containing Fe, Zn, Ni, Cu and O as a main phase, and Cu compound particles present at a grain boundary, having an average particle diameter of 0.5 µm to 10 µm. The ferrite sintered body includes the Cu compound particles present at a grain boundary. It is thereby possible to suppress the grain growth of the crystals serving as the main phase to attain a morphology formed of fine crystals, and also inhibit the propagation of destruction of the grain boundary, thus making it possible to achieve a ferrite sintered body with an improved strength.

9 Claims, 1 Drawing Sheet

(56) References Cited

OTHER PUBLICATIONS

International Search Report issued by Japanese Patent Office for International Application No. PCT/JP2011/067788.

The Extended European Search Report issued by European Patent Office for Application No. EP 11 81 4677, issued on Jan. 22, 2014.

Masayuki Fujimoto, "Inner Stress Induced by Cu Metal Precipitation at Grain Boundaries in Low-Temperature-Fired Ni—Zn—Cu Ferrite.", J. Am. Ceram Soc., 77(11) 2873-78 (1994), vol. 77, No. 11, Jan. 1, 1994.

Office Action dated Aug. 5, 2014 issued in counterpart Japanese application No. 2012-527754.

\* cited by examiner (a)
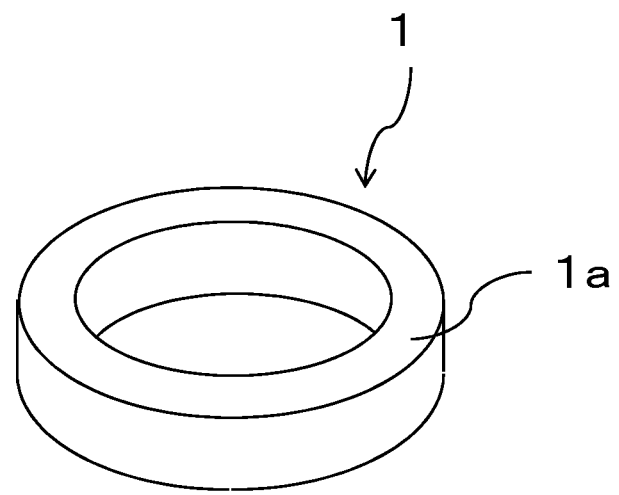
(b)
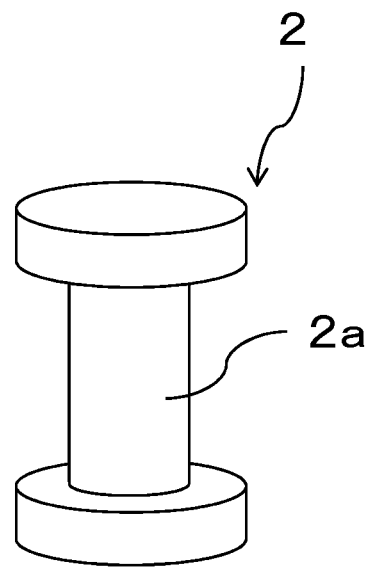

FERRITE SINTERED BODY AND NOISE FILTER INCLUDING THE SAME

TECHNICAL FIELD

The present invention relates to a ferrite sintered body and a noise filter including the same.

BACKGROUND ART

Ferrite sintered bodies formed of Fe—Zn—Ni—Cu-based ferrite materials are widely used as cores of inductors, transformers, stabilizers, electromagnets, noise filters and the like.

Particularly, for electric cars, hybrid cars and the like in which a large number of highly complicated and densified electronic control circuits are mounted, a large number of noise filters using ferrite sintered bodies formed of Fe—Zn—Ni—Cu-based ferrite materials as the cores are used as a measure against noise.

As an example of such Fe—Zn—Ni—Cu-based ferrite materials, Patent Literature 1 proposes a ferrite sintered body formed of a Fe—Zn—Ni—Cu-based material in which X/Y≤3.0 where X is the amount of Cu at the grain boundary and Y is the amount of Cu in the grains in a fracture surface of the ferrite sintered body, and a minimum value of loss (core loss) at 20 to 140° C. is not greater than 30 kW/m$^3$ (50 kHz, 50 mT).

CITATION LIST

Patent Literature

Patent Literature 1: Japanese Unexamined Patent Publication JP-A 8-310856 (1996)

SUMMARY OF INVENTION

Technical Problem

Patent Literature 1 describes a ferrite sintered body having a low loss (core loss) and a high resistivity, but does not describe an improvement in the strength of ferrite sintered bodies in order to cope with the recent increase in miniaturization and reduction in thickness of electronic devices. Furthermore, ferrite sintered bodies for use in car-mounted noise filters are required to be less likely to be damaged as a result of chipping or cracking occurring in part of the sintered bodies due to external stress applied during curing after resin molding.

It is an object of the invention to provide a ferrite sintered body having an improved strength and a noise filter including the same.

Solution to Problem

A ferrite sintered body according to the invention comprises 1 mol % to 10 mol % Cu on CuO basis, a spinel-structured crystal containing Fe, Zn, Ni, Cu and O as a main phase, and Cu compound particles present at a grain boundary, having an average particle diameter of 0.5 μm to 10 μm.

A noise filter according to the invention comprises the ferrite sintered body having the above-described configuration, and a metal wire wound around the ferrite sintered body.

Advantageous Effects of Invention

The ferrite sintered body of the invention includes 1 mol % to 10 mol % Cu on CuO basis, a spinel-structured crystal containing Fe, Zn, Ni, Cu and O as a main phase, and Cu compound particles present at a grain boundary, having an average particle diameter of 0.5 μm to 10 μm. It is thereby possible to suppress the grain growth of the crystals serving as the main phase to attain a morphology formed of fine crystals, and also inhibit the propagation of destruction of the grain boundary, thus making it possible to achieve a ferrite sintered body with an improved strength.

Further, with a noise filter of the invention, it is possible to achieve a noise filter having excellent noise elimination performance by winding a metal wire around a ferrite sintered body having the above-described configuration.

BRIEF DESCRIPTION OF DRAWINGS

FIG. 1 shows examples of the ferrite sintered body of the present embodiment, wherein FIG. 1(a) is a perspective view of a toroidal core and FIG. 1(b) is a perspective view of a bobbin core.

DESCRIPTION OF EMBODIMENTS

Hereinafter, an example of a ferrite sintered body according to the present embodiment and a noise filter using the same will be described.

The ferrite sintered body of the present embodiment includes 1 mol % to 10 mol % Cu on CuO basis, a spinel-structured crystal containing Fe, Zn, Ni, Cu and O as a main phase, and Cu compound particles present at a grain boundary, having an average particle diameter of 0.5 μm to 10 μm. This makes it possible to attain a morphology formed of fine crystals by suppressing the grain growth of the crystals serving as the main phase, and also inhibit the propagation of destruction of the grain boundary that could be caused by an external stress, thus achieving a ferrite sintered body with an improved strength. Further, the presence of the particles of the Cu compound within the grain boundary, especially at triple points, makes it possible to inhibit the propagation of destruction of the grain boundary more effectively.

Further, in order to attain a morphology formed of even finer crystals by suppressing the grain growth of the main phase and further inhibit the propagation of destruction of the grain boundary, the average particle diameter of the Cu compound is preferably in the range of 1 μm or more and less than 5 μm.

Here, as to whether or not the spinel-structured crystal containing Fe, Zn, Ni, Cu and O is present in the ferrite sintered body, a measurement using an X-ray diffractometer (XRD) may be conducted, and the spinel-structured crystal may be identified from the resulting X-ray diffraction chart using JCPDS cards. The spinel-structured crystal can also be identified using a scanning electron microscope (SEM) equipped with an energy dispersive X-ray spectrometer (EDS). Alternatively, an arbitrary surface of the ferrite sintered body can be observed using a transmission electron microscope (TEM), and the spinel-structured crystal can be identified by a selected area electron diffraction method using an energy dispersive X-ray spectrometer.

Further, the average particle diameter of the Cu compound particles can be determined by measuring the particle diameter of a plurality of (for example, ten) Cu compounds that have been identified in an arbitrary surface using a scanning electron microscope equipped with an energy dispersive X-ray spectrometer, and calculating an average value of the obtained ten particle diameters. Note that the particle diameter of a particle of interest is an average value of the diameters of the inscribed circle and the circumscribed circle of the particle of interest. The average particle diameter can also be determined using a transmission electron microscope equipped with an energy dispersive X-ray spectrometer.

Further, in the ferrite sintered body of the embodiment, it is preferable that a ratio X/Y of concentration X of Cu contained in the main phase to concentration Y of Cu contained in the Cu compound is 0.1 to 0.33. When the ratio X/Y is 0.1 to 0.33, the strength of the ferrite sintered body can be further improved.

Note that the ratio X/Y of the concentration X of Cu contained in the main phase to the concentration Y of Cu contained in the Cu compound can be calculated, for example, using a wavelength dispersive X-ray microanalyzer (WDX-EPMA). Specifically, based on a color mapping image obtained by measuring the distribution state of the Cu element in an arbitrary surface of the ferrite sintered body using a wavelength dispersive X-ray microanalyzer, the ratio X/Y is calculated, taking portions with greater count values of intensity of the detected characteristic X ray as the Cu compound, an average value of the counted values of Cu in a plurality of arbitrarily selected Cu compounds as the Cu concentration Y, and an average value of the counted values of Cu in locations of the main phase portion where the Cu compound is not present as the Cu concentration X. Then, the confirmation as to whether the Cu compound is present at the grain boundary can be performed using SEM photographs obtained by capturing images of the same locations as captured in the color mapping image.

Further, in the ferrite sintered body of the present embodiment, it is preferable that the Cu compound comprises $Cu_2O$.

When forming an electrode portion in part of a ferrite sintered body, the ferrite sintered body is immersed in an acidic plating solution, including, for example, a phosphoric acid-based aqueous solution, for a predetermined time, and thereafter treated with plating appropriately selected from Ni plating, Zn plating, Sn plating, Ni—Zn plating, Sn—Zn plating and the like. At this time, when the Cu compound comprises $Cu_2O$ in the ferrite sintered body, the strength of the ferrite sintered body can be maintained even after the immersion in the acidic plating solution because $Cu_2O$ has excellent corrosion resistance to acidic plating solutions.

Further, in the ferrite sintered body of the present embodiment, it is more preferable that 50% or more of the Cu compound particles is $Cu_2O$. As described above, $Cu_2O$ has high corrosion resistance to acidic plating solutions, so that increasing the proportion of the presence of $Cu_2O$ can improve the corrosion resistance to acidic plating solutions, thus maintaining the strength of the ferrite sintered body at a higher level.

Note that the confirmation as to whether the Cu compound comprises $Cu_2O$ can be made, for example, by mechanically polishing part of the ferrite sintered body, processing the surface using an ion milling device, and confirming the compound structure of the Cu compound particles present at the grain boundary by a selected area electron diffraction method using a transmission electron microscope. Also, the confirmation as to whether 50% or more of the Cu compound is $Cu_2O$ can be made by repeating the above-described confirmation of the compound structure for at least ten Cu compounds that are confirmed to be present at the crystal grain boundary.

Further, in the ferrite sintered body of the present embodiment, it is preferable that the ferrite sintered body contains 0.005 mass % to 0.1 mass % of a total of values of oxides of Ca, Si and P based on 100 mass % of components constituting the main phase on CaO basis, on $SiO_2$ basis, and on $P_2O_5$ basis, respectively. When the oxides of Ca, Si, and P are contained in the above-described range, the oxides of Ca, Si, and P act as a sintering aid and can promote sintering so as to make the structure dense, and therefore the strength of the ferrite sintered body can be improved.

Further, in the ferrite sintered body of the present embodiment, it is preferable that a composition of components constituting the main phase other than Cu comprises 40 mol % to 50 mol % Fe on $Fe_2O_3$ basis, 15 mol % to 35 mol % Zn on ZnO basis, and 10 mol % to 30 mol % Ni on NiO basis. Here, the reason why Fe is 40 mol % to 50 mol % on $Fe_2O_3$ basis is that the inclusion of Fe in this range can increase the electrical resistance value, resulting in a tendency for the insulating property to be favorable. Furthermore, the reason why Zn is 15 mol % to 35 mol % on ZnO basis is that the inclusion of Zn in this range results in a tendency for the Curie temperature (Tc) to be increased. Further, the reason why Ni is 10 mol % to 30 mol % on NiO basis is that the inclusion of Ni in this range results in a tendency for the Curie temperature and the magnetic permeability ($\mu$) to be increased. This makes it possible to achieve a ferrite sintered body that is excellent in strength and exhibits a favorable magnetic permeability and a favorable Curie temperature.

Furthermore, in order to achieve a ferrite sintered body that is excellent in strength and exhibits a more favorable magnetic permeability and a more favorable Curie temperature, it is preferable that the components constituting the main phase include 49 mol % to 50 mol % Fe on $Fe_2O_3$ basis, 25 mol % to 35 mol % Zn on ZnO basis, 10 mol % to 20 mol % Ni on NiO basis, and 4 mol % to 7 mol % Cu on CuO basis.

Furthermore, in the ferrite sintered body of the present embodiment, it is preferable that the ferrite sintered body contains not greater than 0.5 mass % Ti excluding 0 mass % based on 100 mass % of components constituting the main phase on $TiO_2$ basis. When not greater than 0.5 mass % Ti excluding 0 mass % is included based on 100 mass % of the components constituting the main phase on $TiO_2$ basis, it is possible to improve the magnetic permeability, and also suppress the temperature change rate of the magnetic permeability. Also, it is preferable that the Ti component is present at the crystal grain boundary in a dispersed state without being aggregated.

Note that the dispersibility of the Ti component in the grain boundary can be confirmed, for example, by measuring the distribution state of the Ti element in an arbitrary surface of the ferrite sintered body using a wavelength dispersive X-ray microanalyzer, and observing the image obtained by color mapping. As a result of the observation, those with poor dispersibility exhibit a locally high concentration of the Ti element, i.e., a lager counted value, in their portion corresponding to the grain boundary, and therefore, they are indicated in a tone different from the tones of the rest of the portions corresponding to the grain boundary in the image obtained by color mapping.

Further, the ferrite material of the present embodiment may contain, for example, S, $Cr_2O_3$, $ZrO_2$ and the like, each in the range of 0.05 mass % or less, as inevitable impurities.

Also, the composition of the components constituting the main phase of the ferrite sintered body may be determined by determining the metallic element amounts of Fe, Zn, Ni and Cu using an ICP (Inductively Coupled Plasma) emission spectrometer or an X-ray fluorescence spectrometer, converting them into the amounts of $Fe_2O_3$, ZnO, NiO and CuO, respectively, and calculating the mol % from the obtained conversion values and the respective molecular weights.

Likewise, the composition of Ca, Si, P and Ti as well may be determined by determining the metallic element amounts of Ca, Si, P and Ti using an ICP emission spectrometer or an X-ray fluorescence spectrometer, converting them into the amounts of CaO, SiO$_2$, P$_2$O$_5$, and TiO$_2$, respectively, and calculating the mass proportion, based on 100 mass % of the components constituting the main phase.

Further, in the ferrite sintered body of the present embodiment, it is more preferable that a Zn compound is present at the grain boundary. When the Zn compound is present at the grain boundary, the magnetic force interaction between the main phases is suppressed, thus making it possible to reduce the temperature change rate of the magnetic permeability. It is preferable that this Zn compound is present within the grain boundary, especially at triple points. Note that in the present embodiment, the Zn compound refers to either of a Zn oxide and a compound containing Zn, O and at least one of Fe, Ni, Cu and Ti.

Further, the Zn compound may be confirmed by mechanically polishing part of the ferrite sintered body, processing the surface using an ion milling device, and confirming the compound structure of the particles present at the grain boundary by a selected area electron diffraction method using a transmission electron microscope.

Next, a method for manufacturing the ferrite sintered body of the present embodiment will described below in detail.

First, oxides of Fe, Zn, Ni and Cu, or primary materials formed of metal salts such as carbonate and nitrate that produce oxides through firing are used, and they are blended at a predetermined ratio. At this time, as for the oxide of Cu or the primary materials that produce oxide through firing, such as carbonate and nitrate serving as the Cu source, those having relative large particle diameters of 1.5 μm to 15 μm are preferably used. More preferably, the particle diameter is 3 μm to 10 μm.

Further, in order to include 0.005 mass % to 0.1 mass % of a total of values of oxides of Ca, Si and P on CaO basis, on SiO$_2$ basis and on P$_2$O$_5$ basis, respectively, 0.005 mass % to 0.1 mass % of these oxides may be added, based on 100 mass % of the primary materials.

Then, after the primary materials are blended, the blended materials are crushed and mixed using a ball mill, a vibration mill or the like, and thereafter calcinated at a maximum temperature of 700° C. to 900° C. to give a calcinated powder. At this time, the temperature rising rate to the maximum temperature is preferably 50° C./hr or more. When the temperature rising rate to the maximum temperature is 50° C./hr or more, it is possible to inhibit the solution of Cu into the main phase, so that a Cu compound having an average particle diameter of 0.5 μm to 10 μm is more likely to be present at the grain boundary.

Next, a slurry obtained by adding a predetermined amount of a binder to the resulting calcinated powder is granulated into spherical granules in a spray granulation device (spray dryer), and the resulting spherical granules are used to perform press molding to give a molded product having a predetermined shape. Thereafter, the molded product was degreased at a temperature in the range of 400 to 800° C. in a degreasing furnace to give a degreased article, which is thereafter fired to a maximum temperature of 1000 to 1200° C. in a firing furnace, thus making it possible to obtain a ferrite sintered body of the present embodiment. At this time, the temperature rising rate from 700° C. to the maximum temperature in the firing step is 50° C./hr to 300° C./hr. Heating with the temperatures in this range inhibits the solution of Cu into the main phase, so that a Cu compound having an average particle diameter of 0.5 μm to 10 μm is more likely to be present at the grain boundary, thus making it possible to improve the strength of the ferrite sintered body.

Further, in the above-described firing step of the molded product, lowering the temperature with a temperature falling rate to 300° C. set to be 400° C./h or more after maintaining the maximum temperature for a predetermined time during firing allows the Cu compound to comprise Cu$_2$O. Furthermore, setting the temperature falling rate to 300° C. to be 500° C./h or more allows 50% or more of the Cu compound present at the grain boundary to be Cu$_2$O.

Further, heat-treating the fired ferrite sintered body at a temperature of 800° C. to 1200° C. for 3 minutes to 30 minutes facilitates the movement of the Cu component contained in the main phase, thus making it possible to increase the concentration of the Cu compound present at the grain boundary. That is, heat treatment at the above-described temperatures results in a smaller ratio X/Y of the concentration X of Cu contained in the main phase to the concentration Y of Cu contained in the Cu compound, and the ratio X/Y can be 0.1 to 0.33.

As another manufacturing method of the present embodiment, it is also possible to apply a method in which CuO of 1 μm to 12 μm is added to the calcinated powder. Note that in the case of using this manufacturing method, the amount of CuO blended as a primary material is decreased by the amount of CuO to be added to the calcinated powder. The amount of CuO added to the calcinated powder may be 30% or less of the total CuO content in a molar ratio.

Note that when TiO$_2$ or a metal salt such as carbonate and nitrate that produces TiO$_2$ through firing is added, as needed, to the calcinated powder within the range of 0.5 mass % or less taking the calcinated powder as 100 mass %, it is possible to improve the magnetic permeability and reduce the temperature change rate of the magnetic permeability.

Further, adding ZnO of 2 μm to 4 μm to the calcinated powder allows the Zn compound to be present at the grain boundary of the ferrite sintered body. Note that the amount of ZnO added to the calcinated powder is 0.001 mol % to 0.03 mol % on ZnO basis.

Then, a ferrite sintered body of the present embodiment that is obtained by such a manufacturing method is excellent in strength and therefore can support reduced sizes and thickness of the members.

The ferrite sintered body of the present embodiment is formed by winding a metal wire around it, and therefore can be used as a noise filter used for eliminating noise of electric circuits. Furthermore, depending on the adjustment of the composition of the components constituting the main phase, it is possible to achieve a ferrite sintered body having high magnetic permeability and Curie temperature and a small absolute value of the temperature change rate of magnetic permeability, in addition to being excellent in strength, so that a noise filter formed by winding a metal wire around the ferrite sintered body has excellent noise elimination performance.

FIG. 1 shows examples of the ferrite sintered body of the present embodiment, wherein FIG. 1(a) is a perspective view of a toroidal core and FIG. 1(b) is a perspective view of a bobbin core.

Also, a noise filter of the present embodiment is formed by winding a metal wire around a winding portion 1a, 2a of a ring-shaped toroidal core 1 as the example shown in FIG. 1(a) or a bobbin-shaped bobbin core 2 as the example shown in FIG. 1(b) to form a coil.

Next, a method for evaluating the characteristics of the ferrite sintered body of the present embodiment will be described.

The three point bending strength can be determined using a test strip shape and a measurement method in accordance with JIS R 1601-2008.

The magnetic permeability can be determined, for example, by uniformly winding ten turns of a coated lead wire having a diameter of 0.2 mm around the entire circumference of the winding portion 1a of a ferrite sintered body in the shape of a ring-shaped toroidal core 1 shown in FIG. 1(a), having outside dimensions of an outer diameter of 13 mm, an inner diameter of 7 mm and a thickness of 3 mm, and measuring the magnetic permeability in an LCR meter under the condition of a frequency of 100 kHz.

Further, the temperature change rate of the magnetic permeability can be determined by establishing a connection to a measurement jig within a constant-temperature bath using a similar sample. Note that the measurement jig is connected to the LCR meter, and the measurement is carried out at a frequency of 100 kHz. The temperature change rate of the magnetic permeability on the low temperature side, $X_{-40-25}$, can be determined using the formula: $(\mu_{-40}-\mu_{25})/\mu_{25}\times 100$ and the temperature change rate of the magnetic permeability on the high temperature side, $X_{25-150}$, can be determined by the formula: $(\mu_{150}-\mu_{25})/\mu_{25}\times 100$, taking the magnetic permeability at 25° C. as $\mu_{25}$, the lowest magnetic permeability when the temperature is decreased from 25° C. to −40° C. as $\mu_{-40}$, and the highest magnetic permeability when the temperature is increased from 25° C. to 150° C. as $\mu_{150}$. Further, the Curie temperature can be determined by a bridge circuit method with an LCR meter using a similar sample.

Hereinafter, specific examples of the invention will be described, but the invention is not limited to the examples.

EXAMPLE 1

Using the total amounts (the same ratio) of $Fe_2O_3$, NiO and ZnO shown in Table 1, ferrite sintered bodies for which the amounts of CuO added, the particle diameters, and the conditions during calcination and firing were varied were produced, and the average particle diameter of the Cu compound present at the grain boundary and the three point bending strength were measured.

First, a powder of $Fe_2O_3$, ZnO and NiO having a particle diameter of 0.5 μm to 3 μm and a CuO powder having a particle diameter of 1 μm to 17 μm were weighed to achieve the ratios shown in Table 1, and were crushed and mixed in a ball mill, followed by heating at the temperature rising rates shown in Table 1 and calcination at a maximum temperature of 800° C. Then, a slurry obtained by adding a binder to the resulting calcinated powder was granulated into spherical granules using a spray granulation device (spray dryer), and press molding was performed using the resulting spherical granules to give a molded product in the shape of a rectangular column of 40 mm long, 55 mm wide and 65 mm tall. Note that a plurality of molded products were produced for each sample. Thereafter, each of the molded products was degreased by being held in a degreasing furnace for five hours at a maximum temperature of 600° C., to give a degreased article.

Thereafter, each degreased article was placed in a firing furnace, then heated from 700° C. to a maximum temperature of 1150° C. in the atmosphere at one of the temperature rising rates shown in Table 1, and held for three hours at a maximum temperature 1150° C. to give a sintered body.

Thereafter, each of the resulting samples, which were sintered bodies, was subjected to grinding to achieve a test strip shape having a thickness of 3 mm, a width of 4 mm, and an overall length of 45 mm. Then, using the test strip, the three point bending strength was measured in accordance with JIS R 1601-2008.

Also, for each of the samples that had been subjected to the three point bending strength measurement, the particle diameters of 10 Cu compounds in an arbitrary surface were measured by a scanning electron microscope equipped with an energy dispersive X-ray spectrometer, and the average particle diameter was determined by calculating an average value of the 10 particle diameters.

Note that the presence of a spinel-structured crystal containing Fe, Zn, Ni, Cu and O in each of the ferrite sintered bodies was confirmed by making measurement by an X-ray diffractometer (XRD) and performing identification from the obtained X-ray diffraction chart using JCPDS cards. Further, as for the composition of the components constituting the main phase of each ferrite sintered body, the compositions as indicated by the addition amounts shown in the Table 1 were confirmed by determining the metallic element amounts of Fe, Zn, Ni and Cu using an ICP emission spectrometer, converting them into the amounts of $Fe_2O_3$, ZnO, NiO and CuO, respectively, and calculating the mol % from the obtained conversion values and the respective molecular weights.

TABLE 1

| Sample No. | Total amount of $Fe_2O_3$, ZnO, NiO (mol %) | Addition amount of CuO (mol %) | Particle diameter of CuO primary material (μm) | Temperature rising rate during calcination (° C./hr) | Temperature rising rate during firing (° C./hr) | Average particle diameter of Cu compound (μm) | Three point bending strength (MPa) |
|---|---|---|---|---|---|---|---|
| 1 | 99.5 | 0.5 | 3 | 50 | 100 | 0.2 | 100 |
| 2 | 99 | 1 | 3 | 50 | 100 | 0.5 | 150 |
| 3 | 98 | 2 | 3 | 50 | 100 | 0.8 | 160 |
| 4 | 95 | 5 | 3 | 50 | 100 | 1 | 180 |
| 5 | 90 | 10 | 3 | 50 | 100 | 2 | 185 |
| 6 | 88 | 12 | 3 | 50 | 100 | 2.4 | 110 |
| 7 | 95 | 5 | 1 | 50 | 100 | 0.2 | 100 |
| 8 | 95 | 5 | 1.5 | 50 | 100 | 0.5 | 150 |
| 9 | 95 | 5 | 3 | 50 | 100 | 1 | 175 |
| 10 | 95 | 5 | 5 | 50 | 100 | 2 | 185 |
| 11 | 95 | 5 | 10 | 50 | 100 | 5 | 170 |
| 12 | 95 | 5 | 13 | 50 | 100 | 8 | 160 |
| 13 | 95 | 5 | 15 | 50 | 100 | 10 | 155 |
| 14 | 95 | 5 | 17 | 50 | 100 | 13 | 110 |
| 15 | 95 | 5 | 3 | 30 | 100 | 0.2 | 110 |
| 16 | 95 | 5 | 3 | 50 | 100 | 1.0 | 170 |
| 17 | 95 | 5 | 3 | 100 | 100 | 3 | 190 |
| 18 | 95 | 5 | 3 | 50 | 40 | 0.2 | 110 |
| 19 | 95 | 5 | 3 | 50 | 50 | 0.5 | 160 |

TABLE 1-continued

| Sample No. | Total amount of $Fe_2O_3$, ZnO, NiO (mol %) | Addition amount of CuO (mol %) | Particle diameter of CuO primary material (μm) | Temperature rising rate during calcination (° C./hr) | Temperature rising rate during firing (° C./hr) | Average particle diameter of Cu compound (μm) | Three point bending strength (MPa) |
|---|---|---|---|---|---|---|---|
| 20 | 95 | 5 | 3 | 50 | 100 | 1 | 175 |
| 21 | 95 | 5 | 3 | 50 | 150 | 2 | 180 |
| 22 | 95 | 5 | 3 | 50 | 180 | 4 | 180 |
| 23 | 95 | 5 | 3 | 50 | 200 | 5 | 170 |
| 24 | 95 | 5 | 3 | 50 | 300 | 10 | 160 |
| 25 | 95 | 5 | 3 | 50 | 320 | 13 | 130 |
| 26 | 95 | 5 | 3 | 30 | 40 | <0.1 | 95 |
| 27 | 95 | 5 | 3 | 30 | 320 | 0.3 | 120 |
| 28 | 95 | 5 | 1 | 50 | 40 | 0.1 | 100 |
| 29 | 95 | 5 | 1 | 50 | 320 | 0.2 | 110 |
| 30 | 95 | 5 | 17 | 50 | 40 | 12 | 120 |
| 31 | 95 | 5 | 17 | 50 | 320 | 14 | 100 |
| 32 | 95 | 5 | 1 | 30 | 100 | 0.1 | 100 |
| 33 | 95 | 5 | 17 | 30 | 100 | 11 | 120 |
| 34 | 95 | 5 | 1 | 30 | 40 | <0.1 | 90 |
| 35 | 95 | 5 | 1 | 30 | 320 | 0.4 | 140 |
| 36 | 95 | 5 | 17 | 30 | 40 | 10.5 | 130 |
| 37 | 95 | 5 | 17 | 30 | 320 | 12 | 120 |

From the results shown in Table 1, it was found that Sample Nos. 2 to 5, 8 to 13, 16, 17 and 19 to 24 had a three point bending strength of 150 MPa or more, and therefore, the strength of the ferrite sintered body can be improved when CuO is 1 mol % to 10 mol % and the average particle diameter of the Cu compound is 0.5 μm to 10 μm.

It was also found that Sample Nos. 4, 5, 9, 10, 17, and 20 to 22, in which the average particle diameter of the Cu compound is 1 μm or more and less than 5 μm, had a particularly high three point bending strength of 175 MPa or more.

It was also found that in order for a Cu compound having an average particle diameter of 0.5 μm to 10 μm to be present at the grain boundary of the ferrite sintered body, it is particularly preferable that the addition amount of CuO is 1 mol % to 10 mol %, the particle diameter of the primary material CuO is 1.5 μm to 15 μm, the temperature rising rate during calcination is 50° C./hr or more, and the temperature rising rate during firing is 50° C./hr to 300° C./hr.

EXAMPLE 2

Next, a method involving adding CuO to the calcinated powder was used to produce ferrite sintered bodies, and the average particle diameter of the Cu compound present at the grain boundary and the three point bending strength were measured.

Note that samples were produced by the same manufacturing method as that used for Sample No. 19 in Table 1 of Example 1 except that CuO was added to the calcinated powder in the addition amounts and particle diameters shown in Table 2. Also, the average particle diameter of the Cu compound present at the grain boundary and the three point bending strength were measured in the same manner as in Example 1. Further, the total addition amount of CuO during the blending and the addition of the calcinated powder was 5 mol % for all the samples. The results are shown in Table 2.

TABLE 2

| Sample No. | Total amount of $Fe_2O_3$, ZnO, NiO (mol %) | Addition amount of CuO during blending (mol %) | Particle diameter of CuO primary material (μm) | Addition amount of CuO to calcinated powder (mol %) | Particle diameter of CuO added to calcinated powder (μm) | Average particle diameter of Cu compound (μm) | Three point bending strength (MPa) |
|---|---|---|---|---|---|---|---|
| 38 | 95 | 3.5 | 3 | 1.5 | 0.5 | 0.3 | 140 |
| 39 | 95 | 3.5 | 3 | 1.5 | 1 | 0.5 | 170 |
| 40 | 95 | 3.5 | 3 | 1.5 | 5 | 3 | 190 |
| 41 | 95 | 3.5 | 3 | 1.5 | 12 | 10 | 180 |
| 42 | 95 | 3.5 | 3 | 1.5 | 15 | 12 | 130 |
| 43 | 95 | 3 | 3 | 2 | 0.5 | 0.4 | 140 |
| 44 | 95 | 3 | 3 | 2 | 1 | 0.5 | 160 |
| 45 | 95 | 3 | 3 | 2 | 5 | 3 | 180 |
| 46 | 95 | 3 | 3 | 2 | 12 | 10 | 170 |
| 47 | 95 | 3 | 3 | 2 | 15 | 13 | 120 |

From the results shown in Table 2, it was found that Sample Nos. 39 to 41 and 44 to 46 had a three point bending strength of 150 MPa or more and therefore the strength of the ferrite sintered bodies can also be improved by the addition of 1 μm to 12 μm CuO to the calcinated powder if the average particle diameter of the Cu compound present at the grain boundary is 0.5 μm to 10 μm.

From the results regarding the strength of Sample Nos. 38 to 42 and 43 to 47, it was also found that the amount of CuO added to the calcinated powder in a molar percentage is preferably 30% or less of the total addition amount of CuO.

EXAMPLE 3

Next, using samples produced by the same manufacturing method as that used for Sample No. 4 in Table 1, heat treatment was performed for 5 minutes at the temperatures shown in Table 3 to give Samples No. 48 to 54. Sample No. 55 is the same as Sample No. 4, for which heat treatment was not performed. Then, as for the concentration X of Cu contained in the main phase of each sample and the concentration Y of Cu contained in the Cu compound, the distribution state of the Cu element was measured using a wavelength dispersive X-ray microanalyzer, the presence of the Cu compound was confirmed from the obtained color mapping image, five Cu compounds were selected arbitrarily, and the concentration Y of Cu contained in the Cu compound, which is an average value of the counted values of Cu, was determined. Further, five locations of the main phase portion where the Cu compound was not present were selected arbitrarily, and the concentration X of Cu contained in the main phase, which is an average value of the counted values of Cu, was determined. Then, the ratio X/Y was calculated. The results are shown in Table 3. Note that the presence of the Cu compound at the grain boundary was confirmed from SEM photographs obtained by capturing images of the above-described selected locations of the Cu compound.

Further, the three point bending strength was measured in the same manner as in Example 1. The results are shown in Table 3.

TABLE 3

| Sample No. | Heat-treatment temperature (° C.) | Cu concentration Main phase X | Cu compound Y | Ratio (X/Y) | Three point bending strength (MPa) |
| --- | --- | --- | --- | --- | --- |
| 48 | 750 | 83 | 238 | 0.35 | 185 |
| 49 | 800 | 80 | 240 | 0.33 | 200 |
| 50 | 900 | 75 | 250 | 0.3 | 210 |
| 51 | 1000 | 60 | 300 | 0.2 | 220 |
| 52 | 1100 | 44 | 352 | 0.13 | 210 |
| 53 | 1200 | 40 | 400 | 0.1 | 200 |
| 54 | 1300 | 35 | 420 | 0.08 | 165 |
| 55 | — | 190 | 152 | 1.25 | 180 |

From the results shown in Table 3, it was found that Sample Nos. 49 to 53, in which the heat-treatment temperature was within the range of 800 to 1200° C., had a three point bending strength value of 200 MPa or more, and therefore the strength can be improved by the ratio X/Y being 0.1 to 0.33.

EXAMPLE 4

Next, experiments for confirming the influence of $Cu_2O$ present at the grain boundary were conducted.

First, degreased articles of samples that were similar to Sample No. 17 in Table 1 were prepared using the same manufacturing method as that used in Example 1. Then, the articles were fired by being held for three hours at a maximum temperature of 1150° C., and the temperatures of the articles were thereafter lowered at a temperature falling rate to 300° C. of 300, 400, 500, 550, and 600° C./h, respectively, to give Sample Nos. 56 to 59. Note that the temperature lowering was performed by opening the damper, and feeding air at room temperature from a metal pipe inserted into the firing furnace.

Thereafter, for each of the samples, whether the Cu compound comprised $Cu_2O$ at the grain boundary was confirmed. First, each sample was cut into fine pieces by machining, the surface of the cut pieces of the sample was mechanically polished, and the surface was processed using an ion milling device. Next, the processed sample surface was subjected to a selected area electron diffraction method using a transmission electron microscope, thus confirming the compound structure of the particles of the Cu compound present at the grain boundary. Note that this confirmation was performed for 10 pieces per sample. Then, the presence of $Cu_2O$ and the ratio of the presence of $Cu_2O$ were calculated.

Next, each sample was immersed in a hypophosphorous acid aqueous solution, which is an acidic plating solution used for electroless nickel plating, for five minutes, and thereafter washed in pure water, and the three point bending strength was measured in accordance with JIS R 1601-2008. The results are shown in Table 4.

TABLE 4

| Sample No. | Temperature falling rate (° C./h) | Presence of $Cu_2O$ | Ratio of presence of $Cu_2O$ (%) | Three point bending strength after immersion in plating solution (MPa) |
| --- | --- | --- | --- | --- |
| 17 | 300 | Absent | — | 155 |
| 56 | 400 | Present | 30 | 160 |
| 57 | 500 | Present | 50 | 175 |
| 58 | 550 | Present | 70 | 180 |
| 59 | 600 | Present | 90 | 185 |

The results shown in Table 4 indicated that for Sample No. 17 of Example 1, for which the temperature falling rate to 300° C. is 300° C./h, the presence of $Cu_2O$ was not confirmed, and the three point bending strength value after the immersion in the acidic plating solution was decreased to 155 MPa, as compared to a three point bending strength of 190 MPa when no immersion was performed.

In contrast, for Sample Nos. 56 to 59, for which the temperature falling rate to 300° C. is 400° C./h or more, the presence of $Cu_2O$ was confirmed and the three point bending strength value was 160 Mpa or more, so that it was found that the strength of the ferrite sintered body can be maintained as a result of $Cu_2O$ present at the grain boundary having excellent corrosion resistance to the acidic plating solution.

Further, it was found that Sample Nos. 57 to 59, for which the temperature falling rate to 300° C. is 500° C./h or more, had a three point bending strength value of 175 MPa or more because the ratio of presence of $Cu_2O$ present at the grain boundary is 50% or more, and therefore the strength of the ferrite sintered body can be maintained at a higher level.

EXAMPLE 5

Next, samples containing oxides of Ca, Si and P were produced, and the three point bending strength was measured.

Using the same composition range as that of Sample No. 17 in Table 1, CaO, SiO$_2$ and P$_2$O$_5$ were added during blending in the amounts shown in Table 5 based on 100 mass % of the composition by the same manufacturing method as that used in Example 1, to give Samples Nos. 60 to 83, which had the shape of a test strip having a thickness of 3 mm, a width of 4 mm, and an overall length of 45 mm. Thereafter, the three point bending strength was measured in accordance with JIS R 1601-2008. The results are shown in Table 5.

TABLE 5

| Sample No. | CaO (mass %) | SiO$_2$ (mass %) | P$_2$O$_5$ (mass %) | Total (mass %) | Three point bending strength (MPa) |
|---|---|---|---|---|---|
| 60 | 0.001 | 0.001 | 0.001 | 0.003 | 190 |
| 61 | 0.005 | — | — | 0.005 | 191 |
| 62 | — | 0.005 | — | 0.005 | 190 |
| 63 | — | — | 0.005 | 0.005 | 190 |
| 64 | 0.003 | 0.002 | — | 0.005 | 192 |
| 65 | 0.003 | — | 0.002 | 0.005 | 191 |
| 66 | — | 0.003 | 0.002 | 0.005 | 190 |
| 67 | 0.002 | 0.002 | 0.001 | 0.005 | 215 |
| 68 | 0.003 | 0.001 | 0.001 | 0.005 | 210 |
| 69 | 0.007 | 0.002 | 0.001 | 0.01 | 212 |
| 70 | 0.005 | 0.003 | 0.002 | 0.01 | 220 |
| 71 | 0.002 | 0.003 | 0.005 | 0.01 | 215 |
| 72 | 0.03 | 0.01 | 0.01 | 0.05 | 210 |
| 73 | 0.02 | 0.02 | 0.01 | 0.05 | 215 |
| 74 | 0.01 | 0.01 | 0.03 | 0.05 | 210 |
| 75 | 0.07 | 0.02 | 0.01 | 0.1 | 205 |
| 76 | 0.05 | 0.04 | 0.01 | 0.1 | 210 |
| 77 | 0.03 | 0.06 | 0.01 | 0.1 | 213 |
| 78 | 0.01 | 0.08 | 0.01 | 0.1 | 208 |
| 79 | 0.02 | 0.03 | 0.05 | 0.1 | 210 |
| 80 | 0.01 | 0.01 | 0.08 | 0.1 | 205 |
| 81 | 0.05 | 0.04 | 0.03 | 0.12 | 195 |
| 82 | 0.05 | 0.06 | 0.01 | 0.12 | 192 |
| 83 | 0.07 | 0.04 | 0.01 | 0.12 | 190 |

From the results shown in Table 5, it was found that Sample Nos. 67 to 80 were able to achieve an improved strength as a result of having a three point bending strength value of 200 MPa or more and containing 0.005 mass % to 0.1 mass % of a total of values of oxides of Ca, Si and P on CaO basis, on SiO$_2$ basis and on P$_2$O$_5$ basis, respectively.

EXAMPLE 6

Next, samples having varied compositions of Fe$_2$O$_3$, NiO, ZnO and CuO were produced, and experiments for evaluating the magnetic permeability, the Curie temperature and the temperature change rate of the magnetic permeability of these samples were conducted. Note that the samples were produced by the same manufacturing method as that used for was Sample No. 16 of Example 1 except that the fired samples had dimensions of an outer diameter of 13 mm, an inner diameter of 7 mm and a thickness of 3 mm and the shape of a toroidal core.

Then, 10 turns of a coated copper wire having a wire diameter of 0.2 mm were wound around each of the obtained samples and the magnetic permeability was measured using an LCR meter under the condition of a frequency of 100 kHz. Further, using the same samples as those used for the magnetic permeability measurement, the inductance was measured by a bridge circuit method using an LCR meter, and the Curie temperature was determined.

Further, using the same samples as those used for the measurement of the magnetic permeability (μ), the magnetic permeabilities $\mu_{-40}$, $\mu_{25}$, and $\mu_{150}$ were measured at −40° C., 25° C., and 150° C., respectively, the temperature change rate $X_{-40\text{-}25}$ of the magnetic permeability from −40° C. to 25° C. was determined using the formula: $(\mu_{-40}-\mu_{25})/\mu_{25}\times 100$ and the temperature change rate $X_{25\text{-}150}$ of the magnetic permeability from 25° C. to 150° C. was determined using the formula: $(\mu_{150}-\mu_{25})/\mu_{25}\times 100$. The results are shown in Table 6.

TABLE 6

| Sample No. | Content (mol %) | | | | Magnetic permeability μ | Curie temperature Tc (° C.) | Temperature change rate of magnetic permeability (%) | |
|---|---|---|---|---|---|---|---|---|
| | Fe$_2$O$_3$ | ZnO | NiO | CuO | | | $X_{-40\text{-}25}$ | $X_{25\text{-}150}$ |
| 84 | 25 | 37 | 33 | 5 | 790 | 72 | 17 | 22 |
| 85 | 25 | 40 | 30 | 5 | 680 | 65 | 18 | 22 |
| 86 | 30 | 32 | 33 | 5 | 180 | 150 | 23 | 27 |
| 87 | 35 | 30 | 30 | 5 | 340 | 160 | 18 | 23 |
| 88 | 40 | 25 | 30 | 5 | 900 | 170 | 24 | 29 |
| 89 | 45 | 25 | 25 | 5 | 980 | 170 | 32 | 38 |
| 90 | 47 | 23 | 25 | 5 | 920 | 175 | 30 | 37 |
| 91 | 49 | 20 | 26 | 5 | 1010 | 180 | 28 | 36 |
| 92 | 49 | 26 | 18 | 7 | 1200 | 140 | 27 | 31 |
| 93 | 49 | 35 | 10 | 6 | 2800 | 82 | 25 | 18 |
| 94 | 49.5 | 33.5 | 11.5 | 5.5 | 3000 | 89 | 22 | 13 |
| 95 | 49.5 | 30.5 | 16 | 4 | 1500 | 120 | 29 | 18 |
| 96 | 49.5 | 28.5 | 20 | 2 | 1300 | 135 | 31 | 24 |
| 97 | 49.5 | 19.5 | 30 | 1 | 980 | 180 | 35 | 32 |
| 98 | 50 | 15 | 30 | 5 | 820 | 210 | 47 | 45 |
| 99 | 50 | 20 | 25 | 5 | 850 | 180 | 54 | 53 |
| 100 | 50 | 30 | 15 | 5 | 1180 | 160 | 53 | 52 |
| 101 | 55 | 20 | 20 | 5 | 910 | 200 | 108 | 155 |
| 102 | 55 | 10 | 30 | 5 | 430 | 220 | 105 | 144 |
| 103 | 51 | 12 | 32 | 5 | 160 | 220 | 95 | 133 |

From the results shown in Table 6, it was found that a ferrite sintered body having high magnetic permeability and Curie temperature and a small temperature change rate of the magnetic permeability can be achieved when Fe is 40 mol % to 50 mol % on $Fe_2O_3$ basis, Zn is 15 mol % to 35 mol % on ZnO basis, Ni is 10 mol % to 30 mol % on NiO basis, and Cu is 1 mol % to 10 mol % on CuO basis.

It was also found that a ferrite sintered body having higher magnetic permeability and Curie temperature and a small temperature change rate of the magnetic permeability can be achieved when Fe is 49 mol % to 50 mol % on $Fe_2O_3$ basis, Zn is 25 mol % to 35 mol % on ZnO basis, Ni is 10 mol % to 20 mol % on NiO basis, and Cu is 4 mol % to 7 mol % on CuO basis.

From the results shown in Table 7, it was found that it is possible to improve the magnetic permeability while reducing the temperature change rate of the magnetic permeability when not greater than 0.5 mass % Ti is contained on $TiO_2$ basis. In particular, it was found that a ferrite sintered body having higher magnetic permeability and Curie temperature and a small temperature change rate of the magnetic permeability can be achieved when 49 mol % to 50 mol % Fe is contained on $Fe_2O_3$ basis, 25 mol % to 35 mol % Zn is contained on ZnO basis, 10 mol % to 20 mol % Ni is contained on NiO basis, 4 mol % to 7 mol % Cu is contained on CuO basis, and not greater than 0.5 mass % Ti is contained on $TiO_2$ basis.

EXAMPLE 7

Next, samples having varied compositions of $Fe_2O_3$, NiO, ZnO and CuO, and varied addition amounts of $TiO_2$ were produced, and experiments for evaluating the magnetic permeability, the Curie temperature and the temperature change rate of the magnetic permeability of these samples were conducted. Note that the samples were produced by the same manufacturing method as that used for Sample No. 16 of Example 1 except that $TiO_2$ was added in the range shown in Table 7, based on 100 mass % of the calcinated powder, and the measurement was performed in the same manner as in Example 6. Further, Sample Nos. 84 to 103 of Example 6 and Sample Nos. 104 to 123 of Example 7 are different only in terms of the presence of $TiO_2$ contained.

EXAMPLE 8

Next, samples were produced by the same manufacturing method as that used for Sample No. 120 of Example 7 except that $Fe_2O_3$ was 50 mol %, NiO was 15 mol %, CuO was 5 mol %, $TiO_2$ was 0.3 mass % and that, as for ZnO, one having an average particle diameter of 3 μm was used and the addition amount during the blending and the amount added to the calcinated powder were set as shown in Table 8. Then, the Zn compound was confirmed in the same manner as in Example 4. Further, the magnetic permeability, the Curie temperature and the temperature change rate of the magnetic permeability were measured in the same manner as in Example 6. The results are shown in Table 8. Note that the results for the Curie temperature were omitted since no change was observed.

TABLE 7

| Sample No. | Content (mol %) | | | | $TiO_2$ (mass %) | Magnetic permeability μ | Curie temperature Tc (° C.) | Temperature change rate of magnetic permeability | |
|---|---|---|---|---|---|---|---|---|---|
| | $Fe_2O_3$ | ZnO | NiO | CuO | | | | $X_{-40\text{-}25}$ | $X_{25\text{-}150}$ |
| 104 | 25 | 37 | 33 | 5 | 0.3 | 900 | 72 | 15 | 20 |
| 105 | 25 | 40 | 30 | 5 | 0.3 | 800 | 65 | 15 | 20 |
| 106 | 30 | 32 | 33 | 5 | 0.3 | 200 | 150 | 20 | 25 |
| 107 | 35 | 30 | 30 | 5 | 0.3 | 400 | 160 | 15 | 20 |
| 108 | 40 | 25 | 30 | 5 | 0.3 | 1000 | 170 | 20 | 25 |
| 109 | 45 | 25 | 25 | 5 | 0.3 | 1100 | 170 | 30 | 35 |
| 110 | 47 | 23 | 25 | 5 | 0.3 | 1200 | 175 | 28 | 35 |
| 111 | 49 | 20 | 26 | 5 | 0.3 | 1250 | 180 | 25 | 34 |
| 112 | 49 | 26 | 18 | 7 | 0.3 | 1380 | 140 | 25 | 29 |
| 113 | 49 | 35 | 10 | 6 | 0.3 | 2950 | 82 | 23 | 15 |
| 114 | 49.5 | 33.5 | 11.5 | 5.5 | 0.3 | 3220 | 89 | 20 | 10 |
| 115 | 49.5 | 30.5 | 16 | 4 | 0.3 | 1610 | 120 | 27 | 15 |
| 116 | 49.5 | 28.5 | 20 | 2 | 0.3 | 1420 | 135 | 28 | 21 |
| 117 | 49.5 | 19.5 | 30 | 1 | 0.3 | 1120 | 180 | 32 | 28 |
| 118 | 50 | 15 | 30 | 5 | 0.3 | 1000 | 210 | 45 | 43 |
| 119 | 50 | 20 | 25 | 5 | 0.3 | 1000 | 180 | 50 | 50 |
| 120 | 50 | 30 | 15 | 5 | 0.3 | 1300 | 160 | 50 | 50 |
| 121 | 55 | 20 | 20 | 5 | 0.3 | 1000 | 200 | 100 | 150 |
| 122 | 55 | 10 | 30 | 5 | 0.3 | 500 | 220 | 100 | 140 |
| 123 | 51 | 12 | 32 | 5 | 0.3 | 200 | 220 | 90 | 130 |
| 124 | 50 | 30 | 15 | 5 | 0.05 | 1000 | 180 | 35 | 40 |
| 125 | 50 | 30 | 15 | 5 | 0.1 | 1100 | 170 | 35 | 40 |
| 126 | 50 | 30 | 15 | 5 | 0.2 | 1200 | 170 | 45 | 45 |
| 127 | 50 | 30 | 15 | 5 | 0.4 | 1300 | 160 | 50 | 50 |
| 128 | 50 | 30 | 15 | 5 | 0.5 | 1400 | 150 | 50 | 50 |
| 129 | 50 | 30 | 15 | 5 | 0.55 | 800 | 180 | 35 | 40 |

TABLE 8

| Sample No. | Addition amount of ZnO during blending (mol %) | Addition amount of ZnO to calcinated powder (mol %) | Presence of Zn compound | Magnetic permeability μ | Temperature change rate of magnetic permeability (%) | |
|---|---|---|---|---|---|---|
| | | | | | $X_{-40\text{-}25}$ | $X_{25\text{-}150}$ |
| 120 | 30 | — | absent | 1300 | 50 | 50 |
| 130 | 29.9995 | 0.0005 | present | 1350 | 47 | 46 |
| 131 | 29.999 | 0.001 | present | 1330 | 45 | 45 |
| 132 | 29.995 | 0.005 | present | 1320 | 44 | 43 |
| 133 | 29.99 | 0.01 | present | 1310 | 43 | 41 |
| 134 | 29.98 | 0.02 | present | 1300 | 42 | 40 |
| 135 | 29.97 | 0.03 | present | 1300 | 42 | 38 |
| 136 | 29.967 | 0.033 | present | 1290 | 41 | 36 |

From the results shown in Table 8, the temperature change rate of the magnetic permeability can be decreased by the presence of the Zn compound at the grain boundary. It was also found that it is possible to maintain or improve the magnetic permeability while decreasing the temperature change rate of the magnetic permeability when the amount of the Zn compound added to the calcinated powder is 0.005 mol % to 0.03 mol %.

REFERENCE SIGNS LIST

1: Toroidal core
1a: Winding portion
2: Bobbin core
2a: Winding portion

The invention claimed is:

1. A ferrite sintered body, comprising
1 mol % to 10 mol % Cu on CuO basis;
a spinel-structured crystal containing Fe, Zn, Ni, Cu and O as a main phase; and
Cu compound particles present at a grain boundary, having an average particle diameter of 0.5 μm to 10 μm which are.

2. The ferrite sintered body according to claim 1, wherein a ratio X/Y of concentration X of Cu contained in the main phase to concentration Y of Cu contained in the Cu compound is 0.1 to 0.33.

3. The ferrite sintered body according to claim 1, wherein the Cu compound comprises $Cu_2O$.

4. The ferrite sintered body according to claim 3, wherein 50% or more of the Cu compound particles is $Cu_2O$.

5. The ferrite sintered body according to claim 1, wherein the ferrite sintered body contains 0.005 mass % to 0.1 mass % of a total of values of oxides of Ca, Si and P based on 100 mass % of components constituting the main phase on CaO basis, on $SiO_2$ basis, and on $P_2O_5$ basis, respectively.

6. The ferrite sintered body according to claim 1, wherein a composition of components constituting the main phase other than Cu comprises 40 mol % to 50 mol % Fe on $Fe_2O_3$ basis, 15 mol % to 35 mol % Zn on ZnO basis, and 10 mol % to 30 mol % Ni on NiO basis.

7. The ferrite sintered body according to claim 1, comprising not greater than 0.5 mass % Ti excluding 0 mass % based on 100 mass % of components constituting the main phase on $TiO_2$ basis.

8. The ferrite sintered body according to claim 1, wherein a Zn compound is present at the grain boundary.

9. A noise filter, comprising:
the ferrite sintered body according to claim 1; and
a metal wire wound around the ferrite sintered body.

* * * * *